United States Patent
Mohler

(10) Patent No.: US 9,905,265 B2
(45) Date of Patent: Feb. 27, 2018

(54) DESTRUCTIVE SYSTEM HAVING A FUNCTIONAL LAYER AND AN ADJACENT REACTIVE LAYER AND AN ASSOCIATED METHOD

(76) Inventor: Jonathan Mohler, West Palm Beach, FL (US)

( * ) Notice: Subject to any disclaimer, the term of this patent is extended or adjusted under 35 U.S.C. 154(b) by 0 days.

(21) Appl. No.: 11/998,908

(22) Filed: Dec. 3, 2007

(65) Prior Publication Data

US 2009/0139422 A1    Jun. 4, 2009

(51) Int. Cl.
| | |
|---|---|
| *E05G 1/12* | (2006.01) |
| *G11B 23/50* | (2006.01) |
| *G11B 23/28* | (2006.01) |
| *G11B 23/00* | (2006.01) |

(52) U.S. Cl.
CPC .............. *G11B 23/505* (2013.01); *E05G 1/12* (2013.01); *G11B 23/0035* (2013.01); *G11B 23/28* (2013.01)

(58) Field of Classification Search
CPC .. E05G 1/12; E05G 1/14; G11B 23/28; G11B 23/288; G11B 23/505; G11B 23/0035
USPC ..................... 109/36, 37; 327/525
See application file for complete search history.

(56) References Cited

U.S. PATENT DOCUMENTS

| | | | | |
|---|---|---|---|---|
| 3,394,218 A | * | 7/1968 | Foudriat | 327/525 |
| 3,638,573 A | * | 2/1972 | Campbell | 102/364 |
| 3,697,668 A | * | 10/1972 | Campbell | 327/525 |
| 3,771,451 A | * | 11/1973 | Woodring | 102/430 |
| 3,827,362 A | * | 8/1974 | Huggett | 89/1.14 |
| 3,882,323 A | * | 5/1975 | Smolker | 327/525 |
| 3,882,324 A | * | 5/1975 | Smolker et al. | 327/525 |
| 3,904,451 A | * | 9/1975 | Rainone | 149/30 |
| 4,236,463 A | * | 12/1980 | Westcott | 109/33 |
| 4,391,196 A | | 7/1983 | Betts | |
| 4,448,130 A | | 5/1984 | Speer | |
| 4,853,676 A | * | 8/1989 | Kitts | 340/543 |
| 4,875,948 A | * | 10/1989 | Verneker | 149/15 |
| 6,779,115 B1 | * | 8/2004 | Naim | 713/192 |
| 7,706,767 B2 | * | 4/2010 | Wu | 455/260 |
| 2005/0011598 A1 | * | 1/2005 | Herget | 149/61 |
| 2006/0006553 A1 | * | 1/2006 | Fuller et al. | 257/790 |
| 2007/0147776 A1 | * | 6/2007 | Ito | 386/94 |
| 2010/0193093 A1 | | 8/2010 | Coffey et al. | |

\* cited by examiner

*Primary Examiner* — Stephen Johnson
(74) *Attorney, Agent, or Firm* — William F. Lang, IV; Lang Patent Law LLC

(57) ABSTRACT

The invention relates to a destruction system for destroying a functional layer, which may receive data or perform other functions, such as optical functions, for example, and a related method. The reactants may be interspersed within the functional layer or may be provided in a separate layer adjacent to the functional layer. The reactants are structured to be ignited to destroy the functionality of the functional layer and the data. Ignition may be obtained through a flame or by suitable electrical current in certain embodiments of the invention.

2 Claims, 7 Drawing Sheets

DESTRUCTIVE SYSTEM HAVING A FUNCTIONAL LAYER AND AN ADJACENT REACTIVE LAYER AND AN ASSOCIATED METHOD

BACKGROUND OF THE INVENTION

1. Field of the Invention

The present invention relates to a functional layer, which may have data stored therein, and a reactive material, which may be in the form of an adjacent reactive layer structured when activated to destroy the functional layer. The present invention also includes a related method.

2. Description of the Prior Art

Electronic devices oftentimes contain disks, magnetic storage media, or other microelectronic devices, which contain data and/or information or perform another function, all of which must be protected from theft by direct reading or by reverse engineering. Data and/or information erasure processes are typically inadequate to protect highly-sensitive data or information.

There remains, therefore, a need for a system for destroying functional layers preferably by means of an associated reactive layer, as well as an associated, related method.

SUMMARY OF THE INVENTION

In one embodiment of the present invention, a destructive system includes a functional layer, as hereinafter defined, and an adjacent reactive layer, wherein the reactive layer is structured to be activated in such a way so as to destroy the functional layers or at least destroy the functionality of the functional layer. In one preferred embodiment, the reactive layer may be structured to produce a very high temperature when ignited and thereby destroy the functional layer. The functional layer may consist of a magnetic storage medium application, a compact disk application, a magnetic disk application, an optical disk application, or a micro-electronic device application, for example.

In another embodiment, the functional layer may be an optical application, which consists of an optical surface application or a reflective surface application.

The reactive layer may be formed by various means, such as physical vapor deposition, co-sprayed plasma forming, or plasma forming.

An object of the present invention is to provide a destruction system that is structured to employ a reactive material to destroy the functionality of a functional layer.

It is another object of the present invention to provide such a system, which is economical to manufacture and can be efficiently used by unskilled personnel.

It is another object of the present invention to employ such a system to destroy a functional layer.

It is another object of the present invention to provide a method of employing a reactive layer to destroy the functionality of a functional layer.

It is another object of the present invention to provide such a reactive layer, which, when activated, will produce a very high temperature in order to destroy the functionality of the functional layer.

It is another object of the present invention to utilize natural capacitance of the alternating fuel/oxidizer sub-layers of the reactive layer for electrical charge storage with the stored charge usable in conjunction with a subsystem for ignition of the reactive layer.

These and other objects of the present invention will be more fully understood from the following detailed description of the invention on reference to the illustrations appended hereto.

Figure 1:
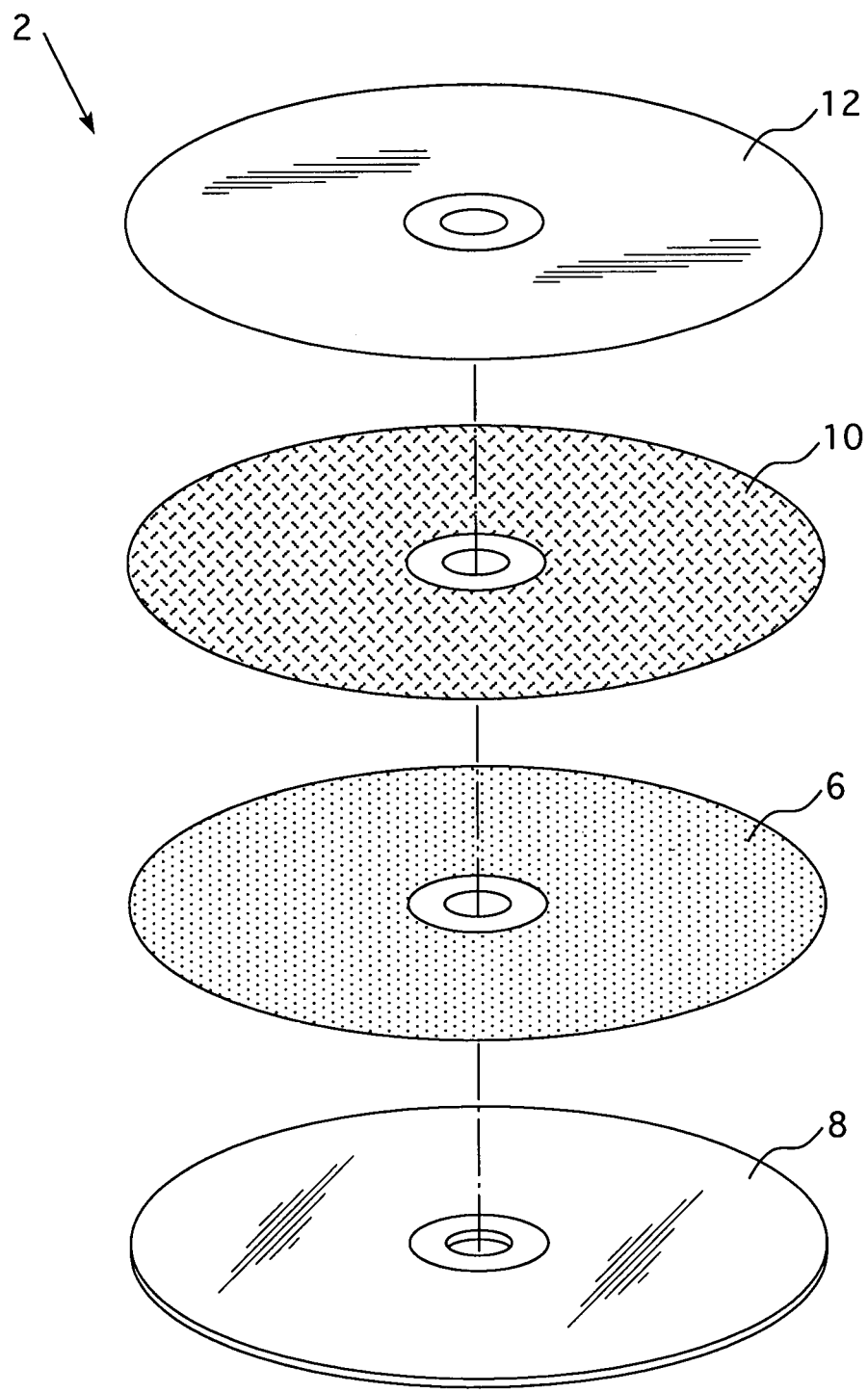
FIG. 1 is an exploded view of a physical vapor deposited form of the present invention applied to a magnetic disk or optical reflective coating.

These and other objects of the present invention will be more fully understood from the following detailed description of the invention on reference to the illustrations appended hereto.

DESCRIPTION OF THE PREFERRED EMBODIMENTS

For purposes of the description hereinafter, the terms "upper," "lower," "vertical," "horizontal," "axial," "top," "bottom," "aft," "behind," and derivatives thereof shall relate to the invention as it is oriented in the drawings or as it is oriented when it is inserted within an electronic device that is resting upright on a flat and level, horizontal surface. It is to be understood, however, that the invention may assume various alternative configurations when the invention is moved about or the electronic device, for example, is situated in a non-upright relationship. It is also to be understood that the specific elements illustrated in the figures and described in the following specification are simply exemplary embodiments of the invention. Therefore, specific dimensions, orientations, and other physical characteristics related to the embodiments disclosed herein are not to be considered limiting.

As employed herein, the term "functional layer" means a component of a system of the present invention, which contains data in or on this layer, serves an optical function, or in another manner, serves as a source of information.

As employed herein, "destruction of the functionality of the functional layer" means destroying all or part of the entire functional layer, but a sufficient amount to preclude effective, unauthorized use of or access to the functional layer.

As employed herein, the term "reactive layer" refers to a layer, which is structured to be activated in such a manner as to destroy the functionality of a functional layer to the point where it no longer provides the desired data information or function even if such destruction of the layer is, in a physical sense, only partial. The reactive layer may preferably be positioned adjacent to a functional layer regardless of whether there are interposed layers therebetween.

As employed herein, the statement that two or more parts are "attached," "connected," "coupled," or "engaged" together shall mean that the parts are joined together either directly or joined indirectly through one or more intermediate parts.

As employed herein, the statement that data is coupled to, provided on, or stored on a part shall mean that the data is coupled to, provided on, or stored on a part directly indirectly through one or more intermediate parts.

As used herein, the term "plasma spraying" means melting and transference of reactants, such as, for example, a metal coating or an intermetallic alloying compound to a mold by use of a nontransferred arc. Typically, with plasma spraying, a powder, rarely a liquid, suspension, or wire, is introduced into a plasma jet, emanating from a plasma torch. In the jet, where the temperature is on the order of about 10,000 Kelvin, the material is melted and propelled toward a mold upon which the reactants are deposited. On the mold, the molten reactants flatten, solidify, and form a data destruction system. The component reactants can be applied by either simultaneous co-spraying or by formation of several alternate fuel and oxidizer layers. Commonly, freestanding parts are produced by removing the deposited reactants from the mold to yield the destruction system.

As used herein, the term "vapor deposition" or "physical vapor deposition" ("PVD") means the growth of a thin film of reactants on a carrier substrate in which a material, such as, for example, metal and oxidizer reactants or alloying reactants, are sequentially either evaporated or sputtered onto the carrier substrate in a vacuum to yield the destruction system reactive layer.

FIG. 1 shows an exploded view of a destruction system 2 with a vapor deposition or physical vapor deposition ("PVD") reactive layer 6 deposited on a substrate 8. The PVD layer may have reactant sub-layers consisting of an oxidizable metal and an oxidizer, such as Al and CuO or Al and $Fe_2O_3$, or alloyable metals, such as Al and Ni or Al and Pd. When reactive layer 6 is activated, as by application of heat or electrical current to initiate a high-temperature chemical reaction, destruction of the functional layer 10 occurs. A functional layer 10 is, in turn, deposited on the reactive layer 6 and is covered by a protective inert layer 12. In the form shown in FIG. 1, the destruction system 2 is structured to be used in a disk operation, a magnetic storage medium application, a reflective mirror application, or a micro-electronic device application, such as a memory stick application, a multichip module application, or a suitable optical disk. The disk application may be, for example, a compact disk application, a magnetic disk application, an optical disk application, or the like. The destruction system 2 functions by producing a high-temperature reaction that destroys or irreversibly alters the structure of the functional layer when the reactive layer is ignited. Any data, readable content, or structure is irreversibly altered by the high-temperature reaction. The substrate layer 8 supports the destruction system assembly.

Figure 2:
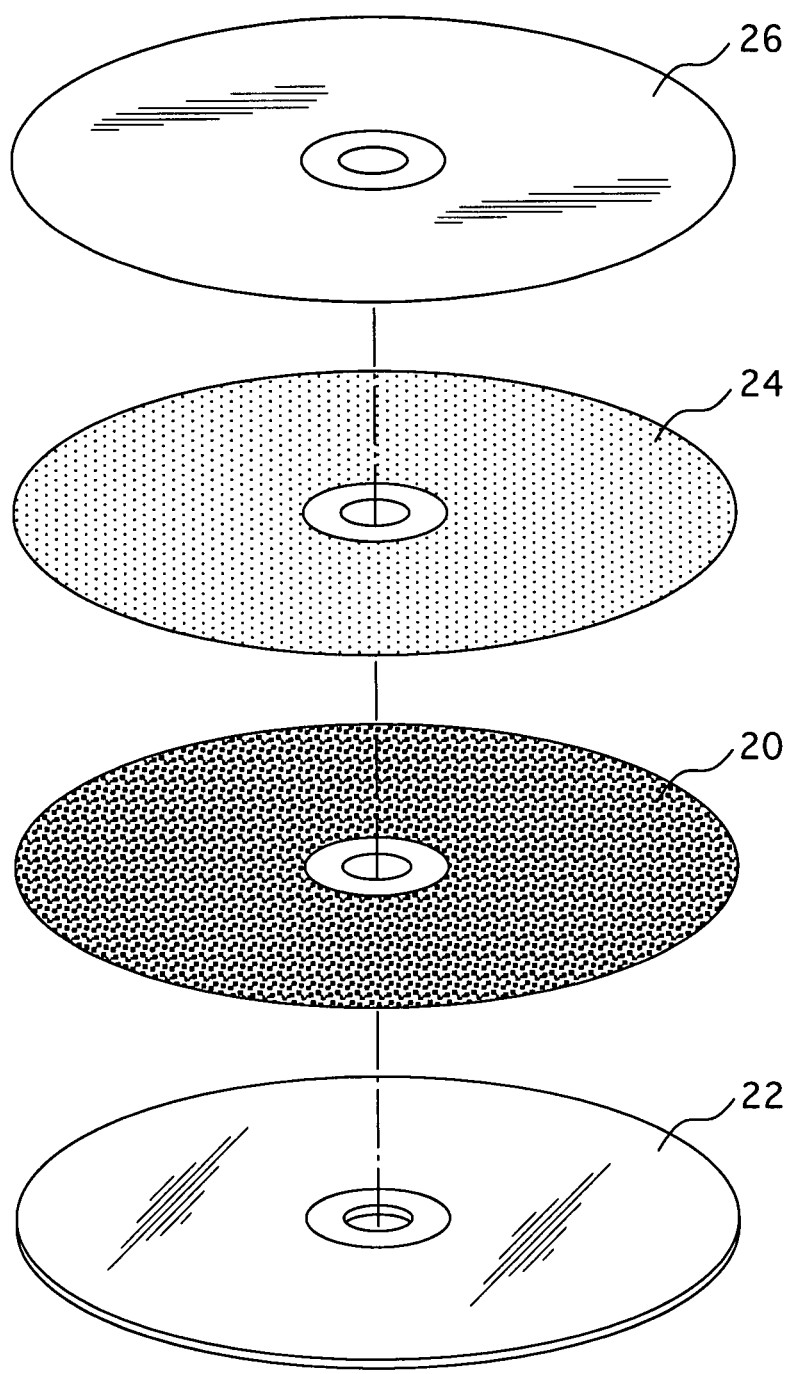
FIG. 2 is an exploded view of a physical vapor deposited form of the present invention applied to an optical disk.

In FIG. 2, the functional (recording) layer 20 is deposited on a transparent substrate 22, which may be polycarbonate, for example. The reactive layer 24 is PVD applied on the functional (recording) layer 20. The reactive layer 24 consists of reactant sub-layers, such as Al and CuO, Al and $Fe_2O_3$, Al and Ni, or Al and Pd. An inert, protective layer 26 is applied over the reactive layer 24. This layering order is appropriate for optical disks in which recording and reading laser beams are transmitted through the transparent substrate.

Figure 3:
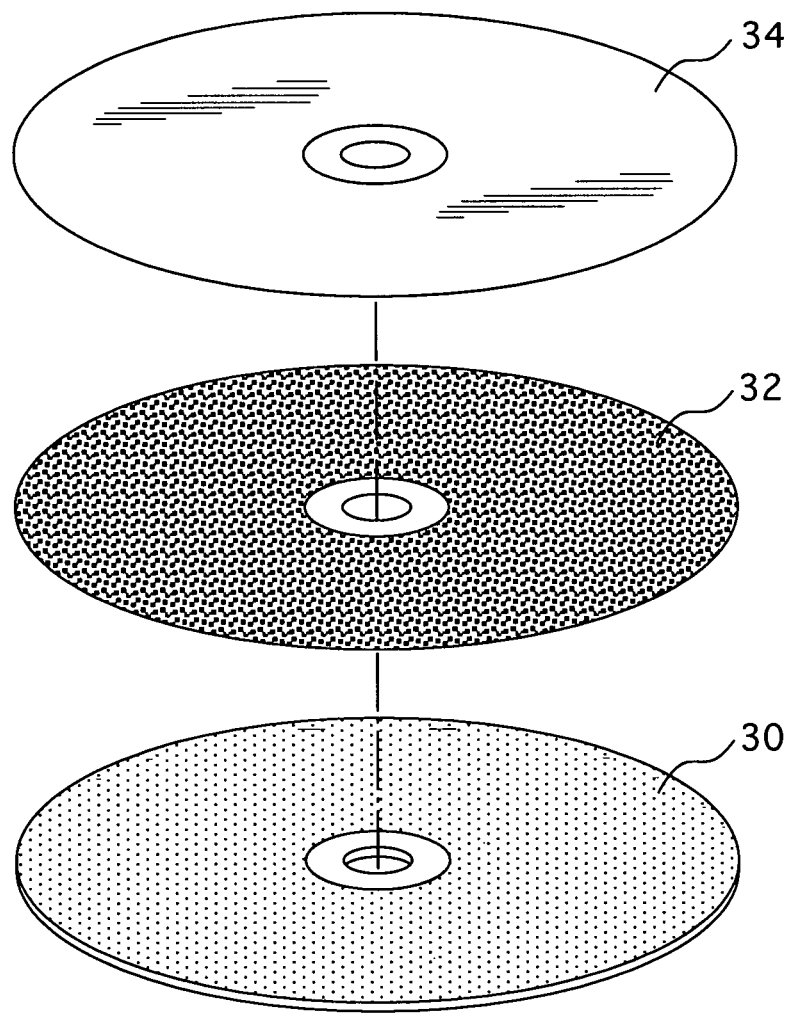
FIG. 3 is an exploded view of a plasma formed version of a reactive substrate applied to a magnetic disk.

Referring to FIG. 3, the disk substrate 30 is formed by plasma spraying reactant materials on a form with subsequent removal from the form followed by machining to give the required dimensions and finish. Reactant materials may be either co-sprayed or applied in sequential layers. Reactants used may be, for example, Al and $Fe_3O_4$, Al and $Cu_2O$, Al, and Ni, Al and Pd. The functional layer 32 is then applied to the finished, reactive substrate, and a protective layer 34 may be applied over the functional layer.

Figure 4:
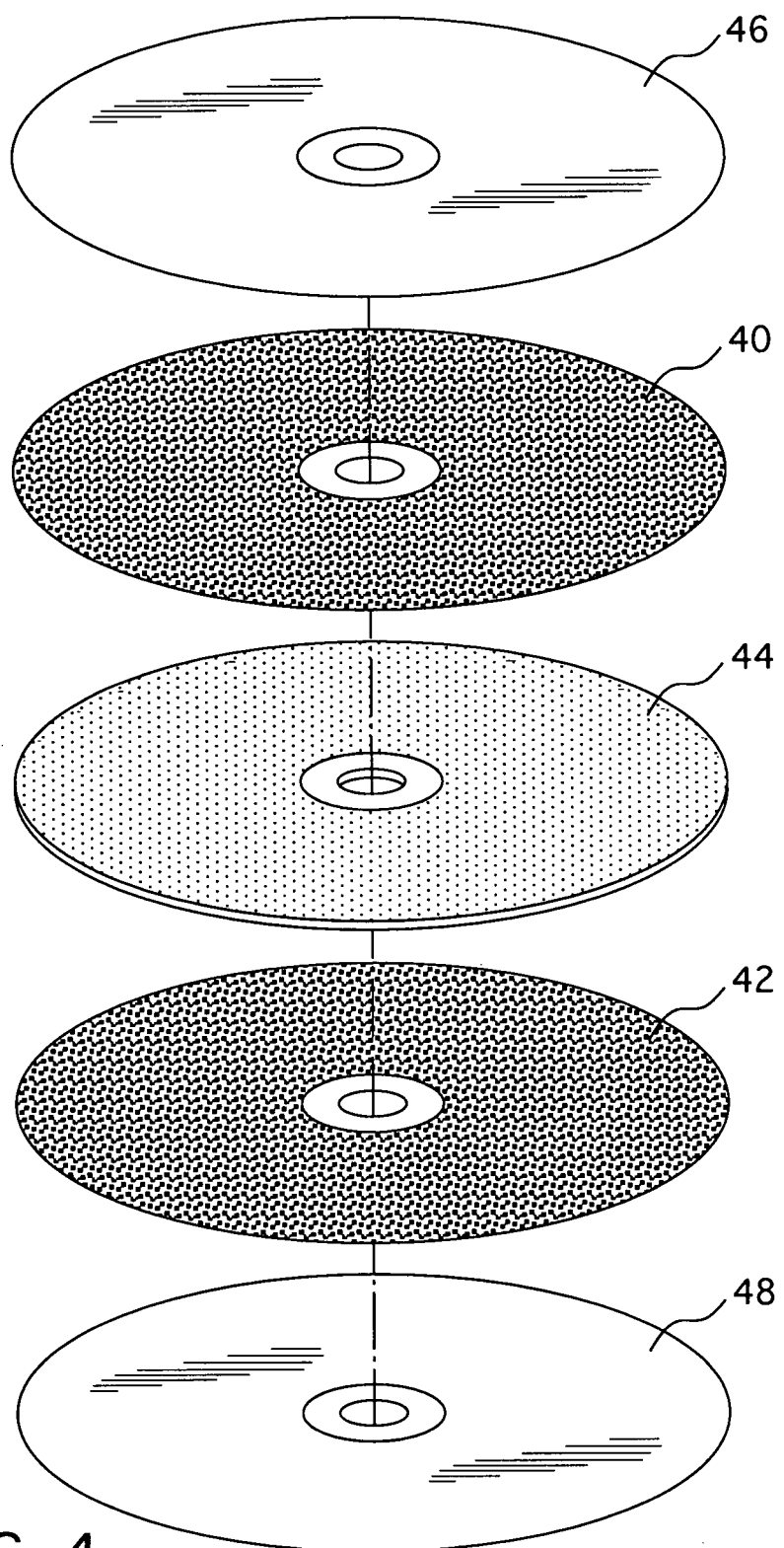
FIG. 4 is an exploded view of a plasma formed version of a reactive substrate applied to a two-sided, magnetic disk

Referring to FIG. 4, functional layers 40, 42 can be applied to both sides of the reactive substrate 44. In certain plasma spray embodiments, the reactive substrate 44 can be formed and/or machined to give unique geometries that are appropriate for various, different applications. Inert layers 46, 48, which may be lacquer layers, are provided adjacent to functional layers.

Figure 5:
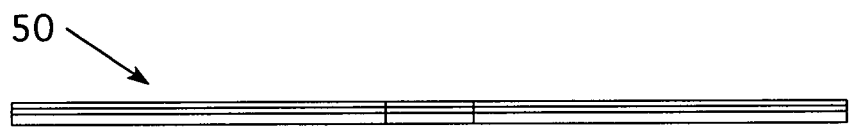
FIGS. 5 and 5(a) are, respectively, an expanded, cross-sectional view and a detail of a co-sprayed, plasma formed version of a reactive substrate applied to a magnetic disk.
Figure 5A:
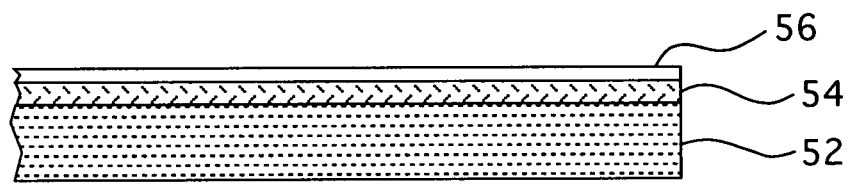

FIGS. 5 and 5(a) show a disk 50 having a destruction system using a co-sprayed plasma reactive layer 52 with functional layers 54 and protective layer 56 applied to one side.

Figure 6:
FIGS. 6 and 6(a) are, respectively, an expanded, cross-sectional view and a detail of a layered, plasma formed version of a reactive substrate applied to a magnetic disk.
Figure 6A:
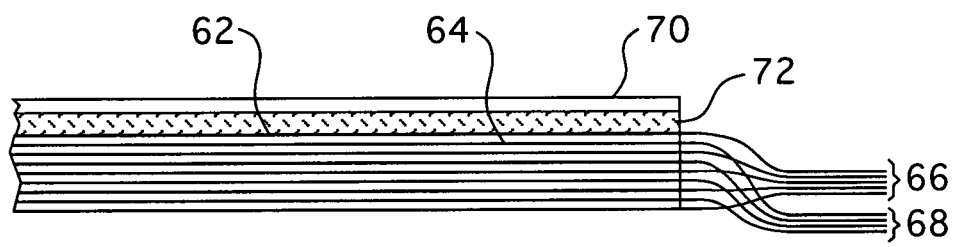

FIGS. 6 and 6(a) show a disk 60 having a destruction system formed using alternate plasma sprayed fuel and oxidizer sub-layers 62, 64 or alloying metal and alloying metal sub-layers 62, 64. Where a fuel (conductive metal) and oxidizer (non-conductive dielectric) are used, a capacitor is formed. A plurality of tabs 66, 68 on alternative conductor layers provide leads for charge storage in the body of the reactive layer. Inert protective layer 70 overlies layer 72.

Referring to FIG. 6, if the reactants on the destruction system have been vapor deposited with alternate sub-layers 62, 64, each of the sub-layers could be approximately from about 20 nm to 100 nm thick. If the sub-layers 62, 64 are plasma sprayed, each sub-layer could be about 20 µm to about 100 µm thick. Whether the reactive layers vapor deposited in sub-layers, co-sprayed plasma or plasma sprayed in layers, the total reactive layer thickness can be built up to whatever is required for the application.

Figure 7:
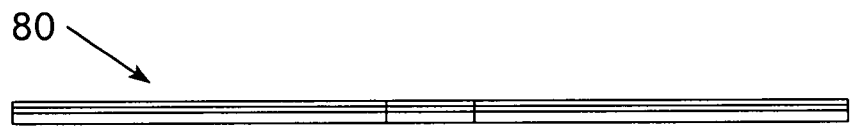
FIGS. 7 and 7(a) are, respectively, an expanded cross-sectional view and a detail of a layered, vapor deposition formed version of a reactive layer on a transparent substrate applied to a functional layer.
Figure 7A:
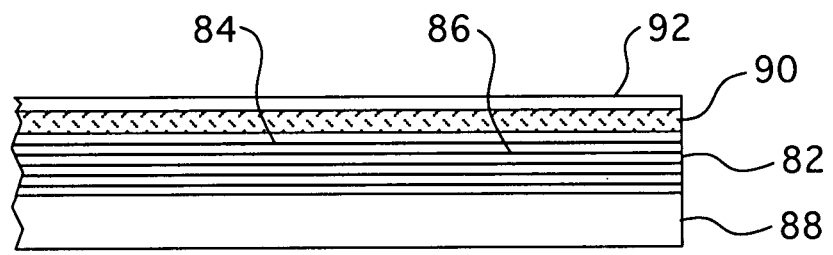

FIGS. 7 and 7(a) show disk 80 having an expanded plasma deposited reactive layer, which is similar to 44 (FIG. 4), in which alternate fuel and oxidizer or alloying metal and alloying metal sub-layers 84, 86 are used. Substrate layer 88, functional layer 90, and protective layer 92 are shown.

Figure 8:
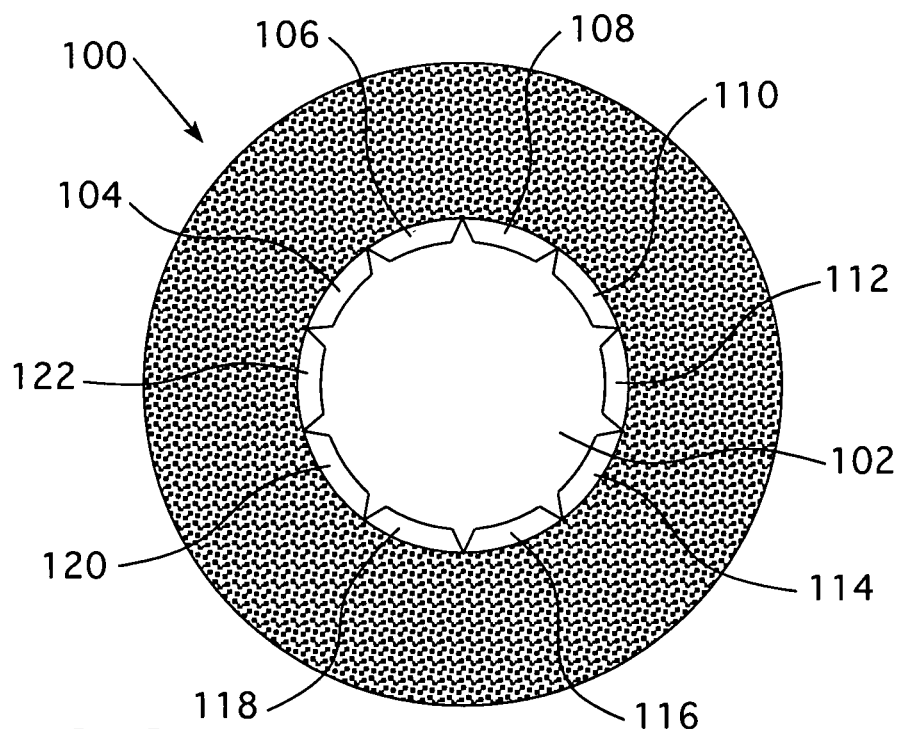
FIG. 8 is a top plan view of a layered, plasma formed version of a reactive substrate with projecting conductive sub-layer tabs for accessing the substrate capacitance.

With reference to FIG. 8, the destruction system 100, shown in top plan view, may have a centering aperture 102 with a number of electrical contacts, such as 104-122 (even numbers only) projecting therein coupled at or proximate to the perimeter of the aperture 102.

The oxidizable metal 62 (FIGS. 6 and 6(a)) or 82 (FIGS. 7 and 7(a)) and the oxidizing agent may be, for example, Al/$Fe_3O_4$, Al/$Cu_2O$, Al/$Fe_2O_3$, Al/$V_2O_5$, or Al/CuO. For Example, Al/$Fe_3O_4$ may comprise from about 22 to about 26 weight percent aluminum, with the balance being essentially $Fe_3O_4$ and typical impurities. The Al/CuO may comprise from about 9 to 13 weight percent aluminum, with the balance being essentially $Cu_2O$ and typical impurities. The Al/CuO may comprise from about 16 to about 20 weight percent aluminum, with the balance being essentially CuO and typical impurities. The alloyable metal combinations may be, for example, Al/Ni or Al/Pd. For example, the Al/Ni may comprise from about 29 to 34 weight percent aluminum, with the balance being essentially Ni and typical impurities. The Al/Pd may comprise, for example, from about 20 to about 24 weight percent aluminum, with the balance being essentially palladium and typical impurities.

Reactive layer ignition can be accomplished by impingement of a high temperature flame or jet from a secondary device on the reactive surface. Alternatively, electrical energy can be used by direct electrode contact with the reactive surface or arcing to the grounded reactive surface. The structural and functional integrity of the functional layer will be destroyed by such ignition.

With regard to certain plasma sprayed embodiments, one could use the natural capacitance of the thin layers of the reactants forming the destruction system to control and/or initiate ignition of the destruction system. One could use the charge stored in the thin layers of the reactants forming the destruction system to ignite the destruction system. In FIG. 8, the destruction device 100 may have a centering aperture 102 with a number of electrical contacts, such as 104-122 (even numbers only), for example, projecting therein, coupled at or proximate to a perimeter of the aperture 102. FIGS. 6, 6(a), and 8 define an embodiment of the destruction system in which the reactive layer can serve as a capacitive electrical charge storage device. The oxidizable metal sub-layers are conductive, and the oxidizing sub-layers form dielectric barriers between the conductive sub-layers. The total capacitance of the reactive layer will be proportional to the total area of the conductive sub-layers and the dielectric constant of the oxidizing sub-layers. Optionally, electrical contacts are formed by forming or coupling thin metal tabs to the conductive sub-layers.

Figure 9:
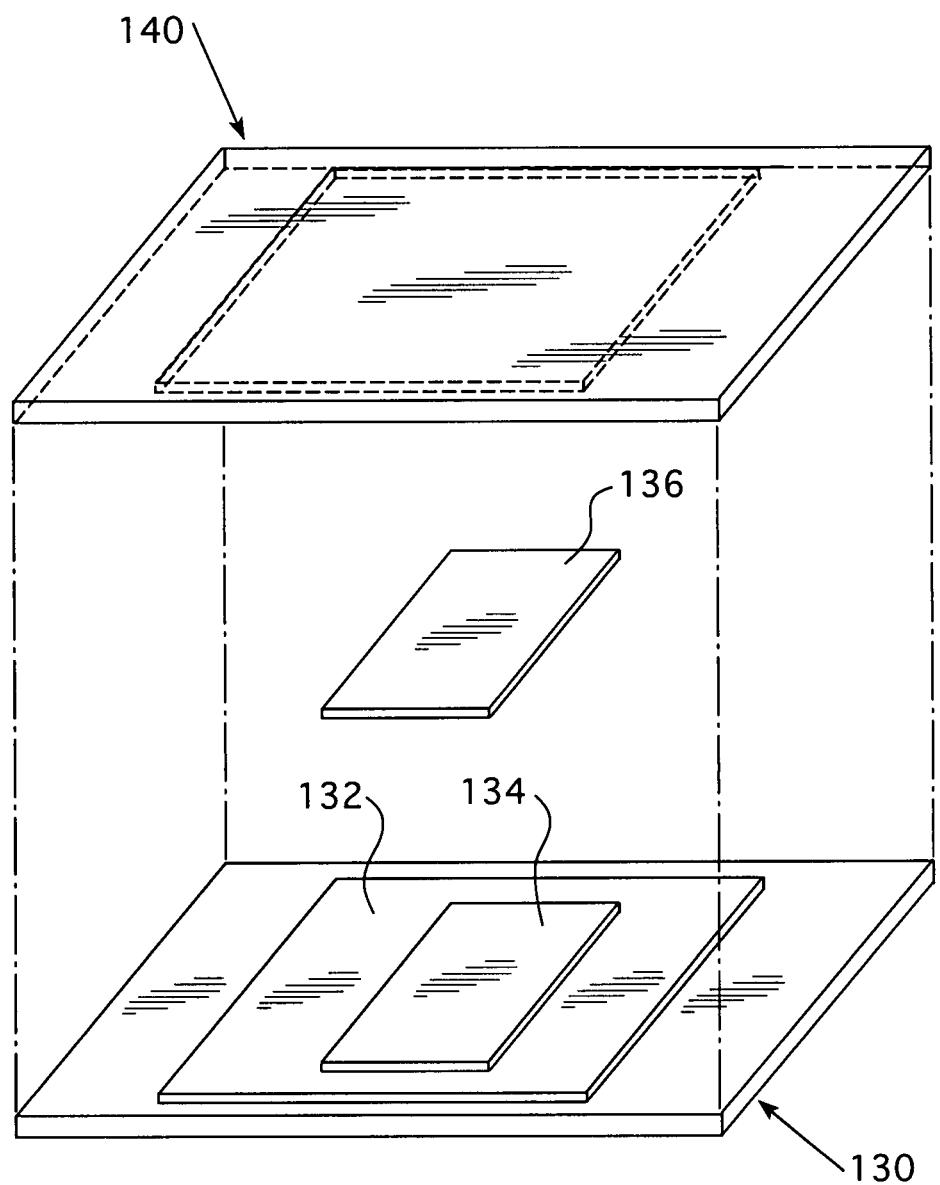
FIG. 9 is an exploded view of another embodiment of the present invention involving an integrated circuit board.

Referring to FIG. 9, there is shown an integrated circuit board 130 and an overlying base 132, which supports an integrated circuit 134. Reactive layer 136 is structured to overlie and be disposed adjacent to integrated circuit 134. Overlying cover member 140 is adapted to be secured to the integrated circuit board 130, so as to provide a sealed assembly.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention, which is to be given the full breadth of the claims appended hereto and any and all equivalents thereof.

What is claimed is:

1. A destructive system for destroying the functionality of an integrated circuit, comprising:
   a base;
   an integrated circuit having a first side and an opposite second size, the first side of the integrated circuit supported by said base;
   a reactive layer comprising metal and oxidizer reactants, at least one of the metal and oxidizer reactants overlying, directly contacting, and being adhered to the opposite second side of said integrated circuit, the reactive layer being deposited upon said integrated circuit; and
   said reactive layer is structured to be ignited to generate an elevated temperature in order to destroy the functionality of said integrated circuit or protect said integrated circuit from theft by direct reading or by reverse engineering.

2. The destructive system of claim 1, wherein said reactive layer is structured to be ignited to generate the elevated temperature in order to protect said integrated circuit from said theft by reverse engineering.

\* \* \* \* \*